(12) United States Patent
Bushell et al.

(10) Patent No.: US 7,025,484 B2
(45) Date of Patent: Apr. 11, 2006

(54) LIGHT SOURCE

(75) Inventors: Timothy George Bushell, Cumbria (GB); Michael Christopher Worgan, Cumbria (GB)

(73) Assignee: Oxley Developments Company Limited, Cumbria (GB)

(*) Notice: Subject to any disclaimer, the term of this patent is extended or adjusted under 35 U.S.C. 154(b) by 211 days.

(21) Appl. No.: 10/439,932

(22) Filed: May 16, 2003

(65) Prior Publication Data
US 2004/0037089 A1 Feb. 26, 2004

(30) Foreign Application Priority Data
May 16, 2002 (GB) ................................. 0211214

(51) Int. Cl.
*F21V 21/00* (2006.01)
(52) U.S. Cl. .................. 362/545; 362/244; 362/470
(58) Field of Classification Search ................ 362/226, 362/240, 244, 545, 548, 470
See application file for complete search history.

(56) References Cited

U.S. PATENT DOCUMENTS

| 4,185,891 | A | * | 1/1980 | Kaestner | ...................... | 372/9 |
| 4,704,004 | A | * | 11/1987 | Nosker | ...................... | 349/67 |
| 5,241,457 | A | * | 8/1993 | Sasajima et al. | ............. | 362/503 |
| 6,616,299 | B1 | * | 9/2003 | Martineau | ................... | 362/244 |

* cited by examiner

*Primary Examiner*—Ali Alavi
(74) *Attorney, Agent, or Firm*—Blakely, Sokoloff, Taylor & Zafman; Stephen M. De Klerk

(57) ABSTRACT

The invention concerns a light source utilizing an array (20, 50) of light emitting elements (22). The elements may be light emitting diodes. A fresnel prism (32, 56) is disposed in front of the array to receive light from it. The prism serves to divert light from the array along a direction (28, 54) oblique to the array, the diverted light forming an output beam. The array has a depth. The output beam from the prism has a depth which, measured in the same plane as the array depth but perpendicular to the beam direction, is smaller than the depth of the array. Hence a deep array provides a shallower output light beam in a manner which is convenient with regard to packaging requirements.

18 Claims, 2 Drawing Sheets

LIGHT SOURCE

CROSS-REFERENCE TO RELATED APPLICATIONS

The present patent application claims priority from United Kingdom Patent Application No. 0211214.2, filed on May 16, 2002.

BACKGROUND OF THE INVENTION

1). Field of the Invention

The present invention is concerned with light sources and more particularly with light sources which utilise a set of light emitters arranged in an array.

2). Discussion of Related Art

Light emitting diodes (LEDs) are often used in this manner. The intensity of a single LED is, despite recent developments in high intensity LEDs, typically smaller than that of a conventional tungsten filament bulb or halogen bulb. To provide increased light intensity from an LED source it is thus known to arrange a set of LEDs side by side in an array, e.g. on a carrier such as a printed circuit board. In this way LED bulbs have been constructed which can be substituted for conventional incandescent bulbs, as to which see for example U.S. Pat. No. 4,211,955 (Ray).

A problem can arise in some contexts due to the lateral dimensions of such an array, as FIGS. 1 and 2 will make clear. FIG. 1 shows a conventional incandescent bulb 2 arranged to emit through a limited aperture 4. The actual light emitting element of the bulb—its filament—has small depth 6 which is in this example not as large as the depth of the aperture 4. As a result a large proportion of the bulb's output can be directed through the aperture, as desired. Compare this with FIG. 2, in which an array 8 of LEDs 9 has been substituted for the bulb 2. Because of its use of multiple LEDs, the array 8 has a depth 10 greater than the width of the aperture 4 and as a result part of the array is obscured.

This type of problem can in particular arise where a light source using a multiple array of light emitters is substituted for a conventional bulb. It is not limited to situations in which light must pass through an aperture. Various optical or packaging requirements can necessitate provision of a light source whose effective depth—i.e. the depth of the emitted beam—is relatively small. To make it possible to provide such a light source while using an array of light emitting elements is an object of the present invention.

An additional or alternative object of the present invention is to provide a light source, using an array of light emitters, which has small depth measured transverse to the direction of an emitted beam.

In the FIG. 2 example, an obvious solution might be to use a conventional circular lens between the array 10 and the aperture 4. Such a solution may not be practical in all cases, particularly due to packaging requirements. It is particularly desired to overcome the above described problems using a light source which is compact.

SUMMARY OF THE INVENTION

In accordance with the present invention there is a light source comprising an array of light emitting elements having a depth, and a fresnel prism disposed in front of the array to receive light from the array, the fresnel prism serving to divert light from the array to a direction oblique to the array, the light diverted by the fresnel prism thereby forming an output beam whose depth, measured transverse to the beam direction and in the same plane as the depth of the array, is smaller than the depth of the array.

Typically the array of light emitting elements will be substantially planar, comprising for example a set of elements mounted upon a flat substrate.

Fresnel prisms are in themselves well known. Particularly preferred embodiments of the present invention utilise fresnel prisms which are themselves substantially planar. Most preferably, refracting elements of the prism are straight and mutually parallel.

The light emitting elements preferably comprise light emitting diodes. It has for some considerable time been recognised as highly desirable to substitute LEDs for conventional light bulbs to achieve improvements in component life time and energy efficiency. The present invention is particularly suited to light sources intended to substitute for conventional light bulbs.

The light source of the present invention may be packaged as a bulb with a fitting for receipt in a bulb socket. More typically, however, the light source comprises a lamp having a housing containing the source components.

In some cases it is desirable to emit light over a wider range of angles than can be provided through the fresnel prism alone. In a preferred embodiment of the present invention, the arrangement of the light emitter array and of the fresnel prism is such that there is a line of sight from at least part of the array to the exterior of the light source so that light is emitted by the source along the said line of sight as well as through the fresnel prism.

In a further preferred embodiment of the present invention, a mirror is disposed to receive light along a line of sight from the array and/or to receive light reflected from the rear of the fresnel prism, and to reflect said light to the source exterior. This may again be used to broaden the range of angles over which light is emitted.

The light source of the present invention may in particular form an exterior aircraft light. Still more specifically the light in question may be a navigation light.

BRIEF DESCRIPTION OF THE DRAWINGS

Specific examples of the present invention will now be described, by way of example only, with reference to the accompanying drawings in which.

iii.

DETAILED DESCRIPTION OF THE INVENTION

Figure 1:
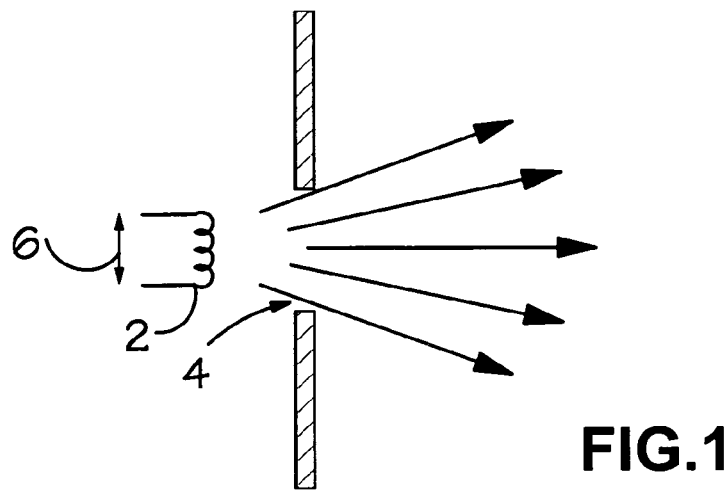
FIG. 1 is a schematic illustration of a light source using a conventional filament bulb, this arrangement not forming an embodiment of the invention.
Figure 2:
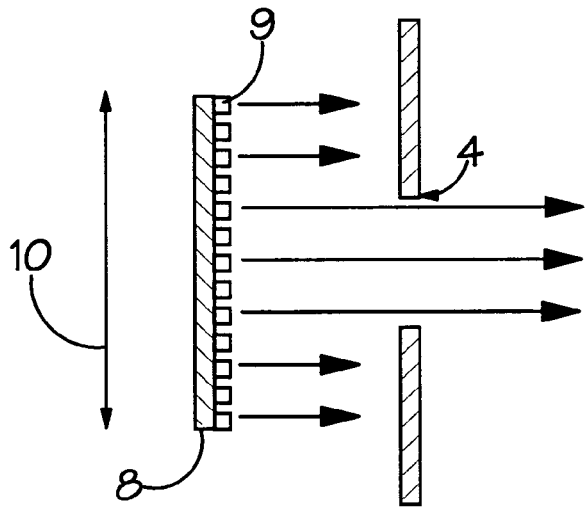
FIG. 2 is a schematic illustration of a hypothetical light source, again not itself forming an embodiment of the present invention, utilising an array of LEDs.
Figure 3:
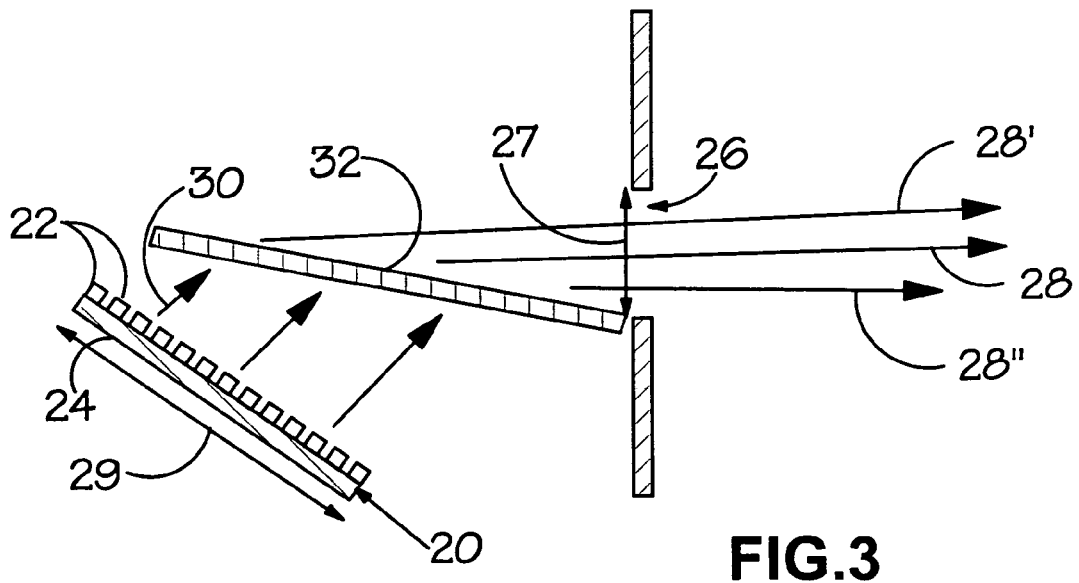
FIG. 3 is a schematic illustration of a first light source embodying the present invention.

FIG. 3 illustrates how a fresnel prism can be used to provide a light source which has small effective depth despite the use of a relatively large array 20 of light emitters 22. The light emitters utilised in this embodiment are LEDs, although it is to be understood that light emitters of other types could conceivably be used in other embodiments of the present invention. The light emitters are arranged side by side on a flat substrate 24 forming a planar array. In FIG. 3, light to be output from the source must pass through an aperture 26 of limited depth 27. The depth 29 of the LED array (measured in the same plane as the depth of the aperture but parallel to the plane of the array) is, as in the FIG. 2 example, greater than the aperture depth.

Light from the source is to be output along an output beam direction 28. Of course light is emitted by the source over a range of angles, as indicated by rays 28' and 28". Nonetheless the beam direction can if necessary be defined as the direction (to be notionally measured at infinity) along which the emitted beam intensity is greatest.

The array 20 is not perpendicular to the beam direction 28. Instead, the array is inclined to the beam direction. In this way, the projection of the array, measured perpendicular to the beam direction 28, is reduced as compared with the FIG. 2 arrangement. This can be beneficial from a packaging point of view. Note, however, that as a result of this inclination of the array, the LEDs 22 emit principally along directions 30 which are not parallel with the beam direction 28. In order to direct light from the LEDs along the required direction, a fresnel prism 32 is provided.

Fresnel prisms are in themselves well known and understood. A plurality of co-extensive optical elements, typically of faceted prismatic type, are used to alter the angle of incident light. In the illustrated example these optical elements are too small to be seen. They are, however, straight and parallel, extending along lines perpendicular to the plane of the drawing. Their effect is to divert the incident rays 30. The angle of incidence, measured with respect to the normal to the plane of the fresnel prism 32, is smaller than the angle of emission, again measured with respect to the normal of the plane of the prism. The light from the LED array 20 is thus diverted along a direction which is oblique to the array. In order to receive light from the array 20, the fresnel prism 32 is arranged in front of the array but is non-parallel thereto in the illustrated example. The fresnel prism 32 (itself a generally planar item) is inclined at a more oblique angle to the beam direction 28 than is the array 20, in the illustrated example. The illustrated fresnel prism operates by transmitting light from the array.

The arrangement allows a large proportion of the light from the array 20 to be output through the aperture 26.

Figure 4:
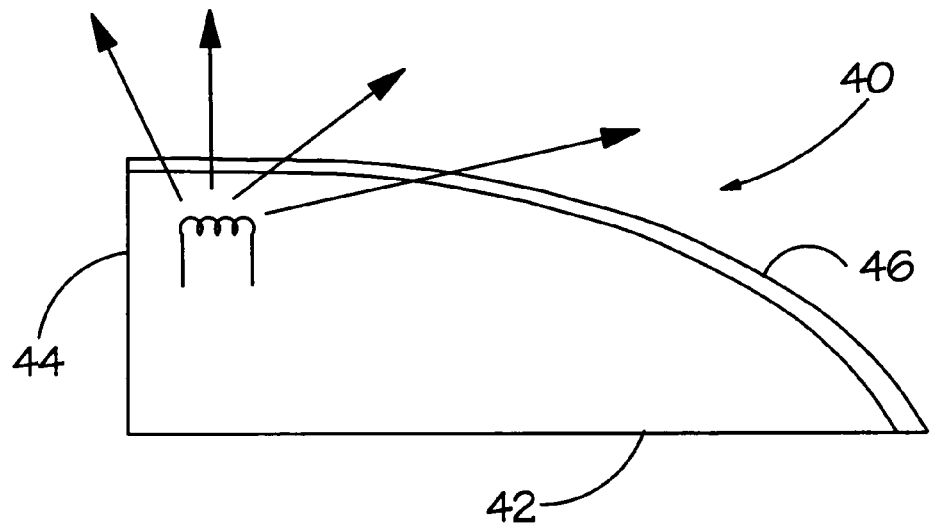
FIG. 4 is a highly simplified side view of part of an aircraft navigation light of known type, not embodying the present invention; and v.

A practical application of the present invention will now be described with reference to FIGS. 4 and 5, both illustrating, in highly simplified form, the front portion of an aircraft lamp having a housing 40 whose inner surface 42 faces toward the aircraft in use and which further comprises an opaque bulkhead 44 and a curved transparent window 46 through which light from a source within the housing is emitted. Conventionally, as in FIG. 4, a halogen bulb 48 has been used as the light source. The illustrated lamp is intended to be mounted at an aircraft wing tip to serve as a navigation light visible to other pilots and a high intensity is required for this purpose. Where, as in FIG. 5, an array 50 of LEDs is used to replace the halogen bulb, a plurality of LEDs must currently be used in order to provide sufficient light output.

Optical and packaging requirements allow only a limited depth (along direction 52) for the light source. Furthermore, while the light must emit over a broad range of angles, its "polar pattern" (the map of emitted light intensity versus angle of emission) must meet requirements laid down by the manufacturers/civil aviation authorities and in particular a significant proportion of the light must be emitted along a forward direction 54. The present invention enables these requirements to be met.

Figure 5:
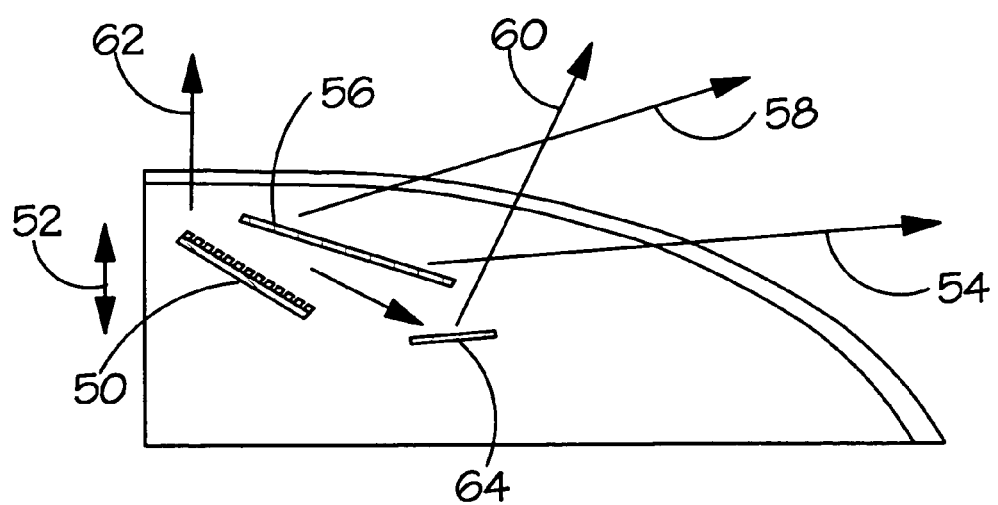
FIG. 5 is a schematic illustration of an aircraft navigation lamp embodying the present invention.

In FIG. 5 the beam of light emitted from fresnel lens 56 extends over a range of angles as indicated by rays 54 and 58. For discussion purposes, direction 54 will be taken as the beam direction. As in FIG. 3, the array 50 of LEDs is inclined to the beam direction 54 and the fresnel prism 56 is a generally planar item disposed in front of the array. The arrangement of the array 50 and fresnel prism 56 is directly similar to the arrangement illustrated in FIG. 3. Note that here the purpose is not simply to provide a narrow beam but rather to provide a beam 54, 58 which is directed along the required direction and to meet the packaging requirements—that the source should have small depth 52. Nonetheless the beam 54, 58 emitted by the fresnel lens again has a depth smaller than that of the LED array 50.

However, the aircraft lamp is also required to emit along lateral directions 60, 62. The fresnel lens does not provide significant emission along these directions and instead the required illumination is provided for in two ways. Firstly, there is a line of sight along lateral direction 62 directly from the upper region of the LED array to the exterior of the lamp. Hence some light from the LEDs emerges directly along this line of sight. Secondly a mirror 64 is arranged adjacent the lower end of the array 50 and receives some light directly from the array 50 and also some light reflected from the rear of the fresnel prism 56. The mirror 64 reflects light from both sources along lateral/forward directions 60.

The beam from the fresnel lens is thus augmented by the beams 60, 62 and as a result the polar pattern requirements can be met.

What is claimed:

1. A light source comprising a housing containing an array of light emitting elements having a depth, and a fresnel prism disposed in front of the array to receive light from the array, the fresnel prism serving to divert light from the array to a direction oblique to the array, the light diverted by the fresnel prism thereby forming an output beam whose depth, measured transverse to the beam direction and in the same plane as the depth of the array, is smaller than the depth of the array, the arrangement of the array and of the fresnel prism being such that there is a line of sight which does not pass through the fresnel prism and which extends from at least part of the array to the exterior of the housing so that light is emitted by the light source along said line of sight as well as through the fresnel prism.

2. The light source as claimed in claim 1 wherein the array of light emitting elements is substantially planar and is oriented obliquely to the beam direction.

3. The light source as claimed in claim 2 wherein the array comprises a set of light emitting elements mounted upon a flat substrate.

4. light source as claimed in claim 1 wherein the light emitting elements comprise a set of light emitting diodes.

5. The light source as claimed in claim 1 wherein the fresnel prism is itself substantially planar and is obliquely oriented to the beam direction.

6. The light source as claimed in claim 5 wherein the fresnel prism comprises refracting elements which are straight and mutually parallel.

7. The light source as claimed in claim 1 wherein a mirror is disposed to receive light along a line of sight from the array and/or to receive light reflected from the rear of the fresnel prism, and to reflect light to the source exterior.

8. The light source as claimed in claim 1 in the form of a lamp having a housing containing the aforementioned components of the source.

9. The light source as claimed in claim 8 in the form of an exterior aircraft light.

10. A light source comprising an array of light emitting elements having a depth, and a fresnel prism disposed in front of the array to receive light from the array, the fresnel prism serving to divert light from the array to a direction oblique to the array, the light diverted by the fresnel prism thereby forming an output beam whose depth, measured transverse to the beam direction and in the same plane as the depth of the array, is smaller than the depth of the array, the light source further comprising a mirror arranged to receive light from the array along a line of sight which does not pass through the fresnel prism, and to reflect the light to the exterior of the light source along a line of sight which does not pass through the array, so that light reflected by the mirror contributes to the polar pattern provided by the light source.

11. The light source as claimed in claim 10 wherein the array of light emitting elements is substantially planar and is oriented obliquely to the beam direction.

12. The light source as claimed in claim 11 wherein the array comprises a set of light emitting elements mounted upon a flat substrate.

13. The light source as claimed in claim 10 wherein the light emitting elements comprise a set of light emitting diodes.

14. The light source as claimed in claim 10 wherein the fresnel prism is itself substantially planar and is obliquely oriented to the beam direction.

15. The light source as claimed in claim 14 wherein the fresnel prism comprises refracting elements which are straight and mutually parallel.

16. The light source as claimed in claim 10 wherein the arrangement of the array and of the fresnel prism is such that there is a line of sight from at least part of the array to the exterior of the light source so that light is emitted by the source along the said line of sight as well as via the fresnel prism.

17. The light source as claimed in claim 10 in the form of a lamp having a housing containing the aforementioned components of the source.

18. The light source as claimed in claim 17 in the form of an exterior aircraft light.

* * * * *